(No Model.)
R. ATHERTON.
WHIRL FOR FILLER FRAMES.
No. 546,288. Patented Sept. 17, 1895.
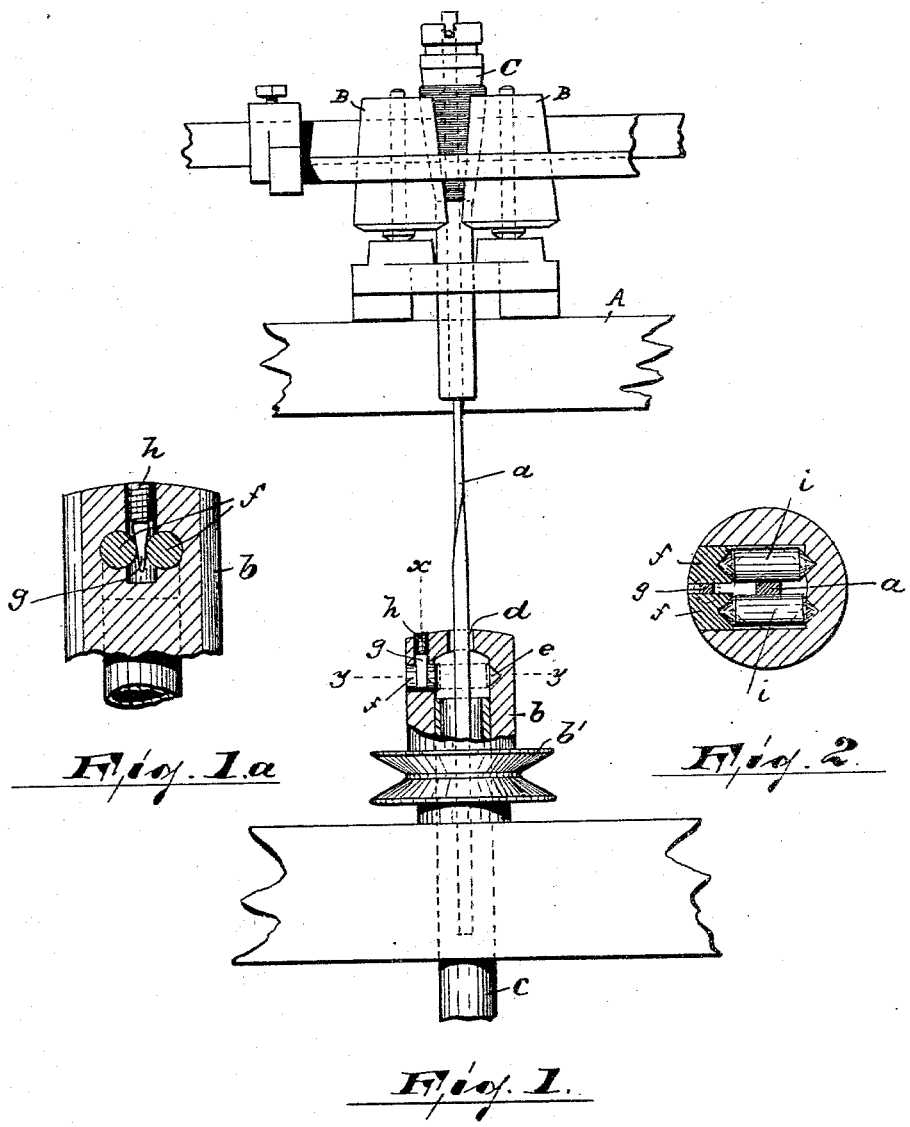
WITNESSES:
Duncan M. Robertson.
Chas. S. Eliot.
INVENTOR:
Robert Atherton
BY
Gartner & Co.
ATTORNEYS.

UNITED STATES PATENT OFFICE.

ROBERT ATHERTON, OF PATERSON, NEW JERSEY.

WHIRL FOR FILLER-FRAMES.

SPECIFICATION forming part of Letters Patent No. 546,288, dated September 17, 1895.

Application filed May 4, 1895. Serial No. 548,116. (No model.)

*To all whom it may concern:*

Be it known that I, ROBERT ATHERTON, a citizen of the United States, residing in Paterson, county of Passaic, and State of New Jersey, have invented certain new and useful Improvements in Whirls for Filler-Frames; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of my invention is to provide a whirl for filler-frames of simple and durable construction and reliable in operation.

The invention consists in the improved whirl, its antifriction-roller, adjusting and retaining mechanism, and in the combination and arrangement of the various parts thereof, substantially as will be hereinafter more fully described, and finally embodied in the clauses of the claim.

Referring to the accompanying drawings, in which like letters of reference indicate corresponding parts in each of the several figures, Figure 1 is a front elevation of a portion of a filler-frame provided with my improved whirl, with certain portions shown in section and others broken away. Fig. 1ª is an enlarged sectional view on line $x$ of Fig. 1, and Fig. 2 an enlarged section on line $y\ y$ of Fig. 1.

In said drawings, A represents a portion of a filler-frame, B B the friction-rollers, and C the quill, all of the usual and well-known construction.

The spindle $a$ extends downward through the quill into the whirl $b$, carrying pulley $b'$, adapted to be operated by a belt or in any desired manner. The hollow whirl turns on a hollow bearing $c$ and is provided at its top with a recess $d$, through which the spindle $a$ passes. The inner wall of the whirl is provided with two conical-shaped recesses $e$, adapted to form bearings for the conical-shaped ends of antifriction-rollers $i\ i$. The wall opposite said recesses is provided with horizontally-arranged cylindrical holes adapted to receive bushings $f\ f$, also forming bearings for the rollers $i\ i$. A substantially perpendicular hole extends downward from the top of the whirl into and between the holes for the bushings and is adapted to receive a wedge-shaped pin $g$ and a tightening-screw $h$. Said pin bears against the inner side of the bushings $f$ and is forced downward by means of the screw $h$, whereby the bushings are easily tightened in any position and thus readily adjusted to the rollers after their respective conical-shaped ends or bearings have become worn down by the continual friction during the operation of the machine.

From the foregoing description it can be seen that a whirl thus constructed is much simpler than ordinary whirls having removable caps and the antifriction-rollers arranged with their respective trunnions in a recess of the whirl. The whirl is solid and strong in construction, and by simply operating the screw $h$ the bushings are adjusted and secured in position, and the frequent changing of the rollers (the trunnions wear out very rapidly) is thus avoided.

Having thus described my invention, what I claim as new, and desire to secure by Letters Patent, is—

1. A tubular whirl provided in its top with a hole or passageway, and in its inner side with conical shaped bearings, a series of bushings forming bearings removably arranged in the wall of the whirl and opposite the conical shaped bearings, a series of rollers having conical shaped ends resting in said bearings, and means for adjustably securing said bushings, substantially as and for the purposes described.

2. A tubular whirl provided at its top with a hole or passageway, and on its inner side with fixed conical shaped bearings, a series of bushings forming bearings removably arranged in the wall of the whirl and opposite said fixed bearings, a series of rollers having conical shaped ends resting in said bearings, a wedge shaped pin between said bushings, and a screw controlling said wedge shaped pin, all said parts, substantially as and for the purposes described.

In testimony that I claim the foregoing I have hereunto set my hand this 1st day of May, 1895.

ROBERT ATHERTON.

Witnesses:
ALFRED GARTNER,
DUNCAN M. ROBERTSON